(12) United States Patent
Slavinski et al.

(10) Patent No.: US 10,633,193 B2
(45) Date of Patent: Apr. 28, 2020

(54) BRICK LAYERING SYSTEM

(71) Applicant: Slab Innovation Inc., St-Hubert (CA)

(72) Inventors: Benoit Slavinski, St-Basile-le-Grand (CA); Ludovic Legendre, Montreal (CA)

(73) Assignee: Slab Innovation Inc., St-Hubert, Qc (CA)

( * ) Notice: Subject to any disclaimer, the term of this patent is extended or adjusted under 35 U.S.C. 154(b) by 46 days.

(21) Appl. No.: 15/842,011

(22) Filed: Dec. 14, 2017

(65) Prior Publication Data

US 2018/0162655 A1 Jun. 14, 2018

(30) Foreign Application Priority Data

Dec. 14, 2016 (CA) ..................... 2951663

(51) Int. Cl.
*B65G 47/26* (2006.01)

(52) U.S. Cl.
CPC .......... *B65G 47/26* (2013.01); *B65G 2201/02* (2013.01)

(58) Field of Classification Search
CPC .......... B65G 47/26; B65G 57/28; B65G 7/08; B65G 57/24; B65G 57/005; B65G 47/086; B65H 31/40; B65H 33/08; Y10S 414/10; Y10S 414/106
See application file for complete search history.

(56) References Cited

U.S. PATENT DOCUMENTS

| | | | | | |
|---|---|---|---|---|---|
| 2,598,222 | A | * | 5/1952 | Cahners | B65G 57/24 414/560 |
| 3,159,399 | A | * | 12/1964 | Davis, Jr. | B65H 31/40 271/210 |
| 3,252,703 | A | * | 5/1966 | Peugnet | B65H 31/40 271/210 |
| 3,260,379 | A | * | 7/1966 | Bason | B65G 57/26 294/62 |
| 4,514,957 | A | * | 5/1985 | Langen | B65B 61/28 53/250 |
| 4,770,339 | A | * | 9/1988 | Weimer | B65D 5/0045 206/509 |
| 4,864,801 | A | * | 9/1989 | Fallas | B65B 5/061 53/446 |

(Continued)

*Primary Examiner* — Gregory W Adams
(74) *Attorney, Agent, or Firm* — Agence de Brevets Fournier

(57) ABSTRACT

A brick layering system includes an infeed conveyor that brings layers of bricks, one or more brick layer compacting systems that remove unwanted gaps in the layers of bricks, an outfeed carousel for receiving compacted piles of bricks and a robot arms that moves the brick layer between the infeed, outfeed and compacting systems. The brick layer compacting system includes a table top having a generally flat surface for receiving the brick layer; and two mechanical stops secured to the table top on the generally flat surface so as to define two straight edges on the table top that are perpendicular to each other. The table top is oriented so that a virtual intersection of both straight edges is lower than any other parts of the two straight edges. Bricks received on the flat surface are moved by gravity towards the virtual intersection of the two straight edges, thereby removing gaps between the bricks and indexing the bricks relative to both straight edges.

14 Claims, 15 Drawing Sheets

(56) References Cited

U.S. PATENT DOCUMENTS

| | | | | |
|---|---|---|---|---|
| 5,344,015 A | * | 9/1994 | Carlin | A47G 1/12 |
| | | | | 206/425 |
| 5,370,303 A | * | 12/1994 | Fry | B65D 5/0045 |
| | | | | 206/509 |
| 5,429,296 A | * | 7/1995 | Southwell | B65D 5/0035 |
| | | | | 229/120 |
| 5,458,283 A | * | 10/1995 | Southwell | B65D 5/0025 |
| | | | | 229/178 |
| 5,507,616 A | * | 4/1996 | Perobelli | B65G 57/00 |
| | | | | 198/781.01 |
| 5,690,275 A | * | 11/1997 | Bose | B65D 5/4295 |
| | | | | 220/676 |
| 6,658,816 B1 | * | 12/2003 | Parker | B65G 57/005 |
| | | | | 414/2 |

* cited by examiner

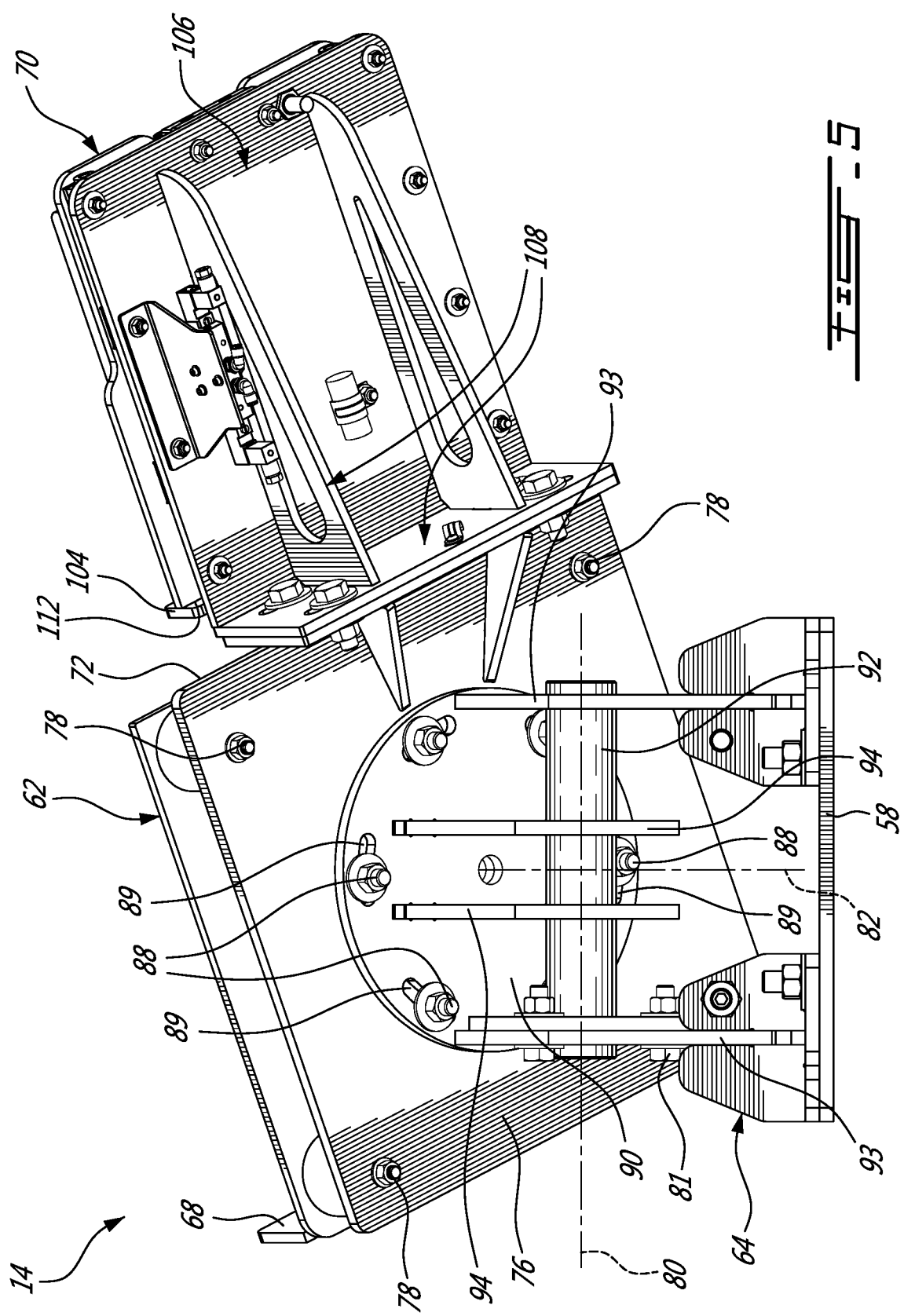

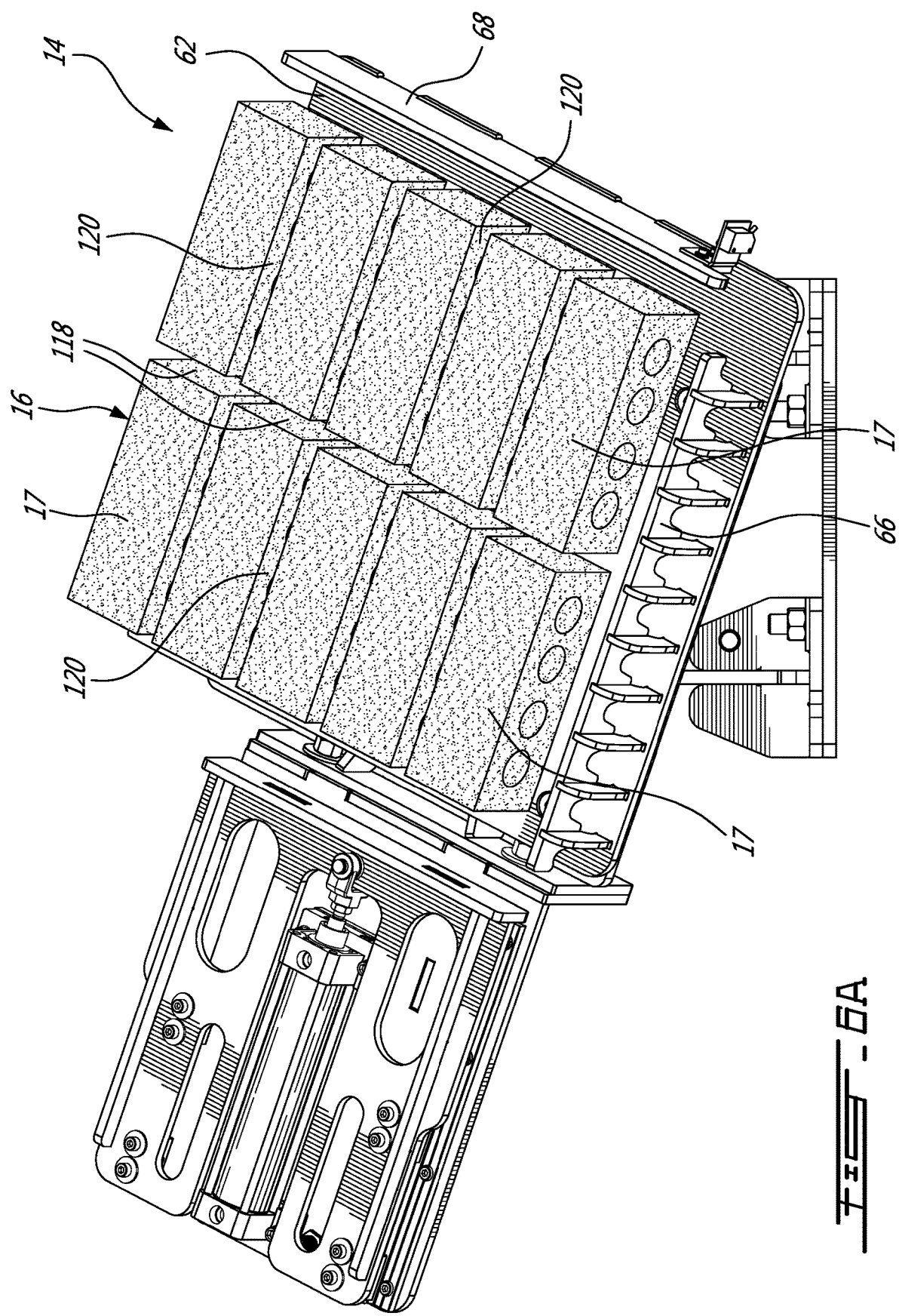

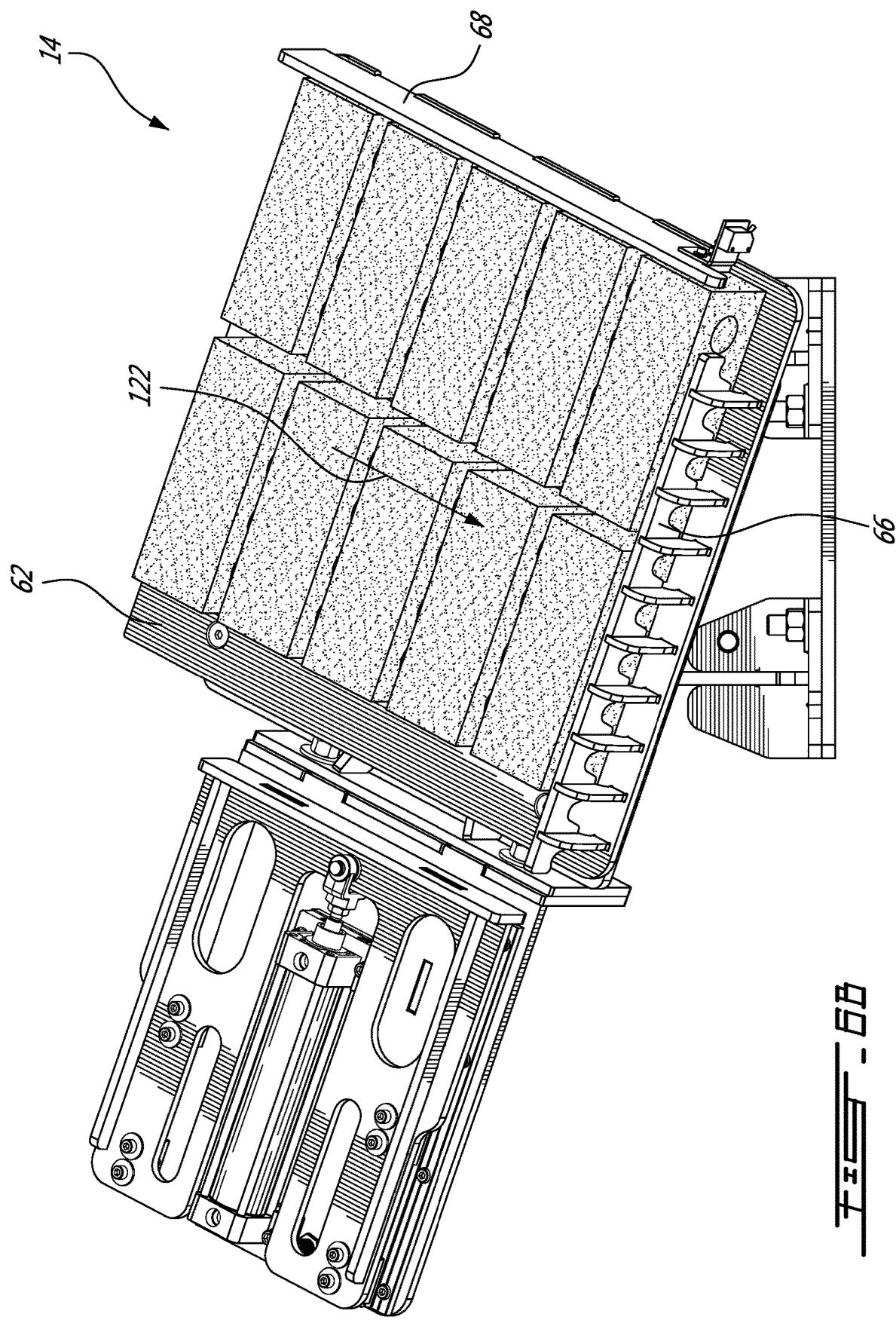

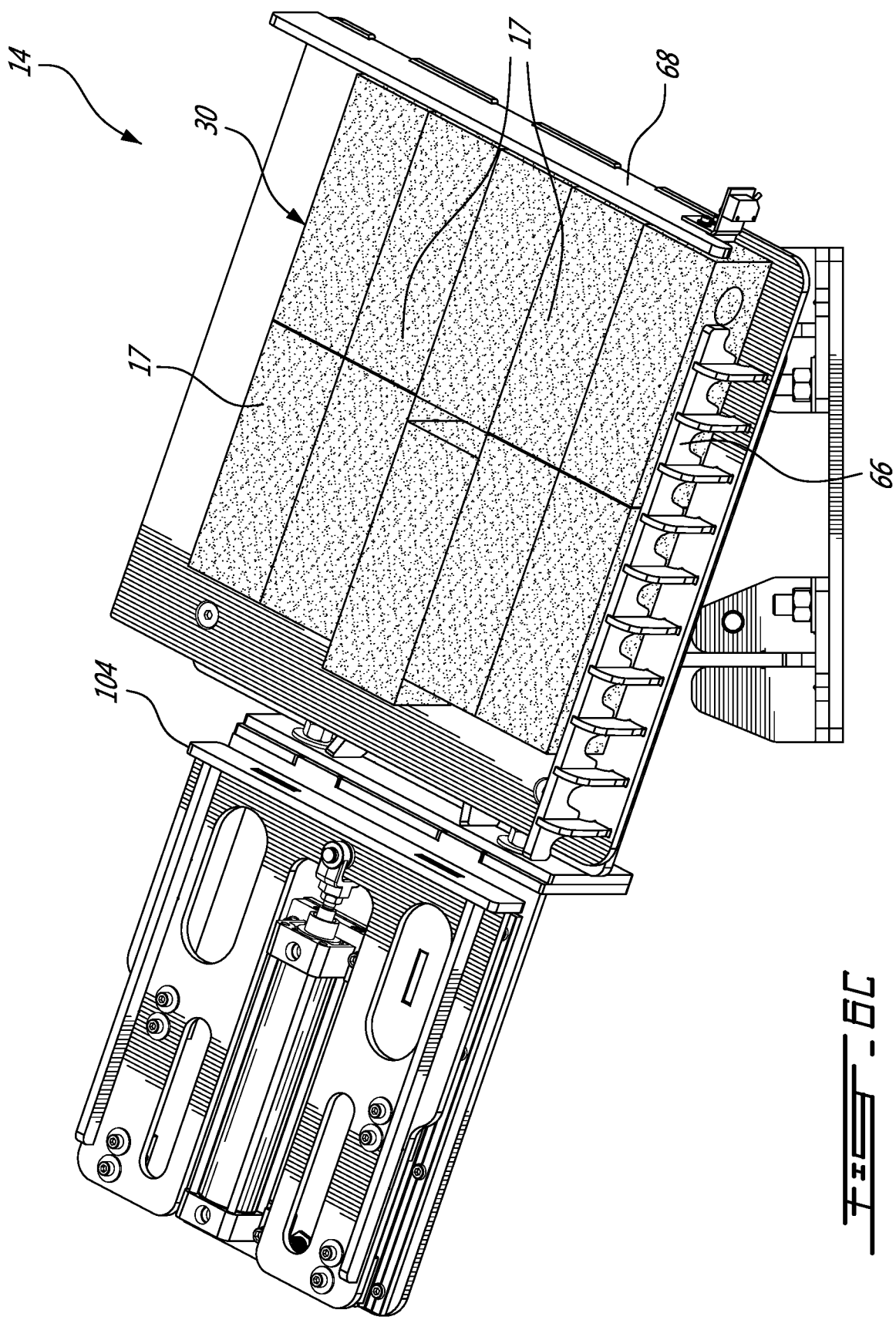

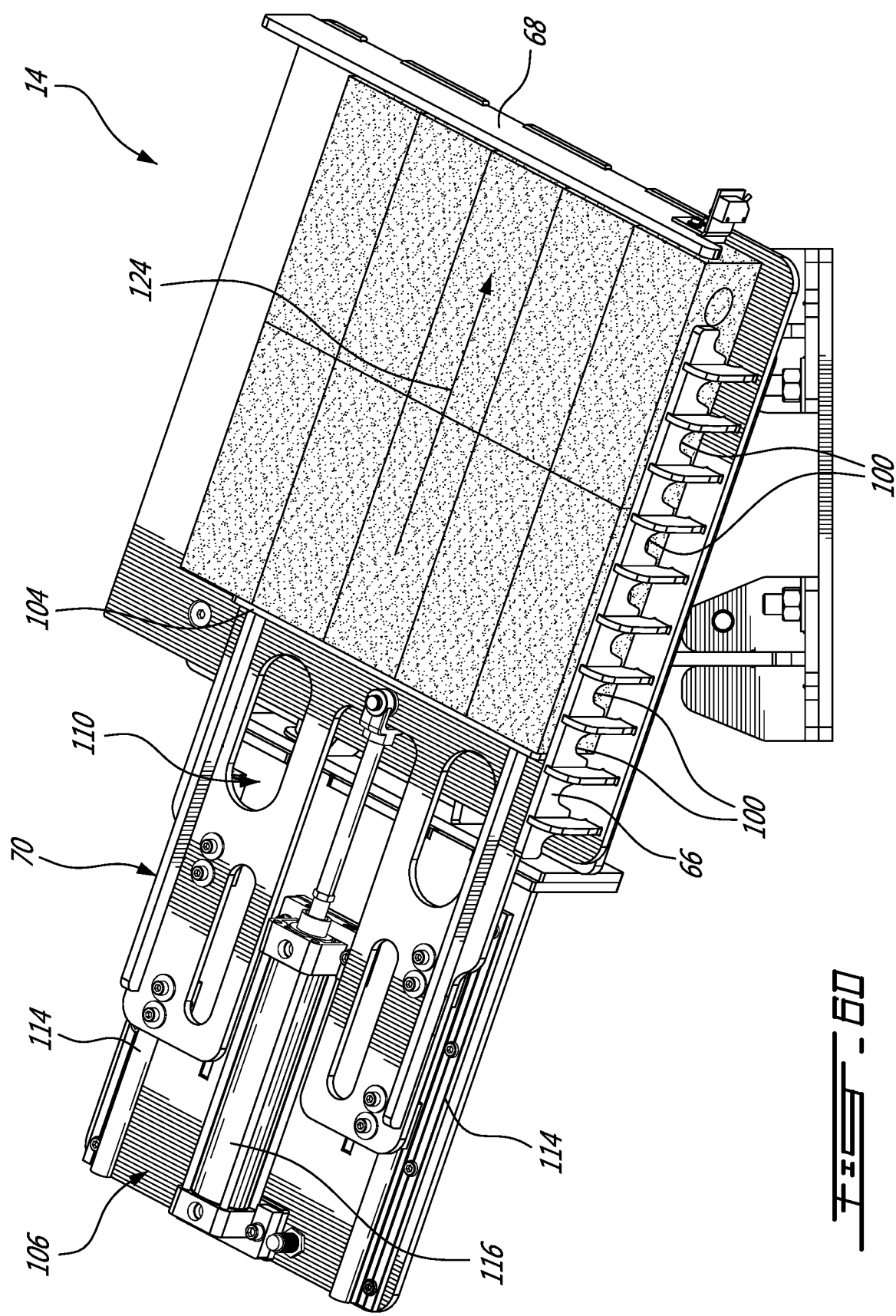

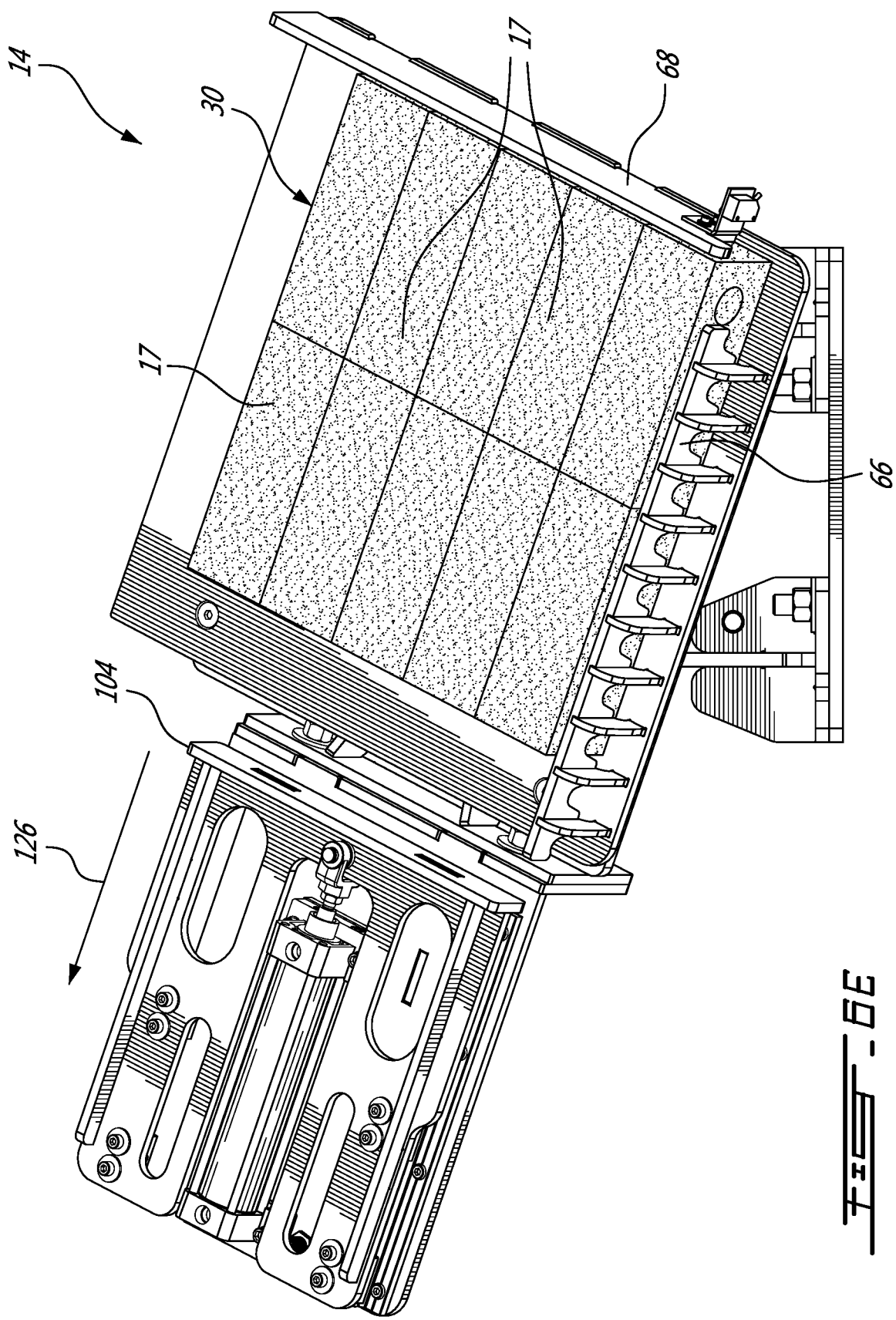

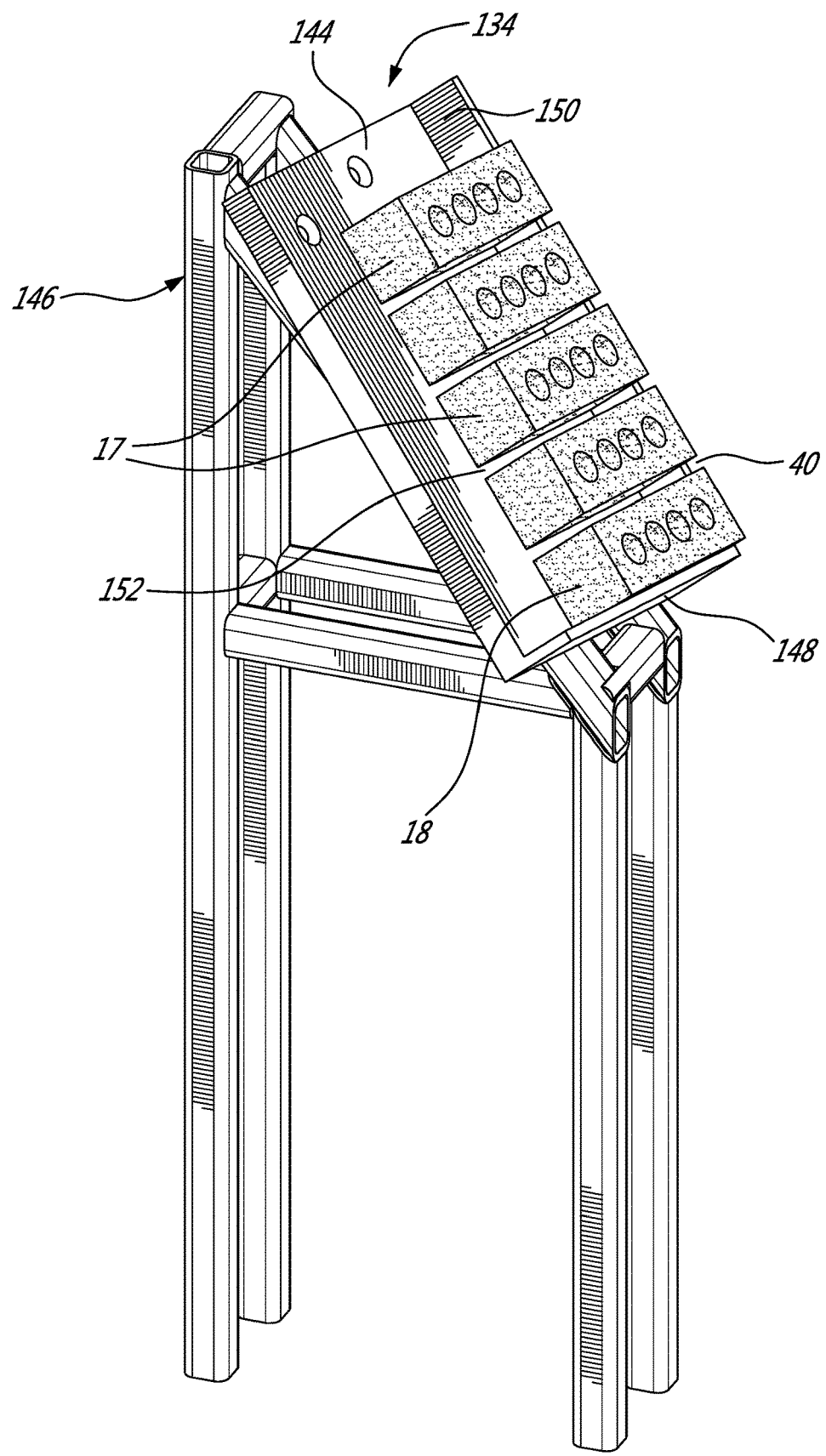

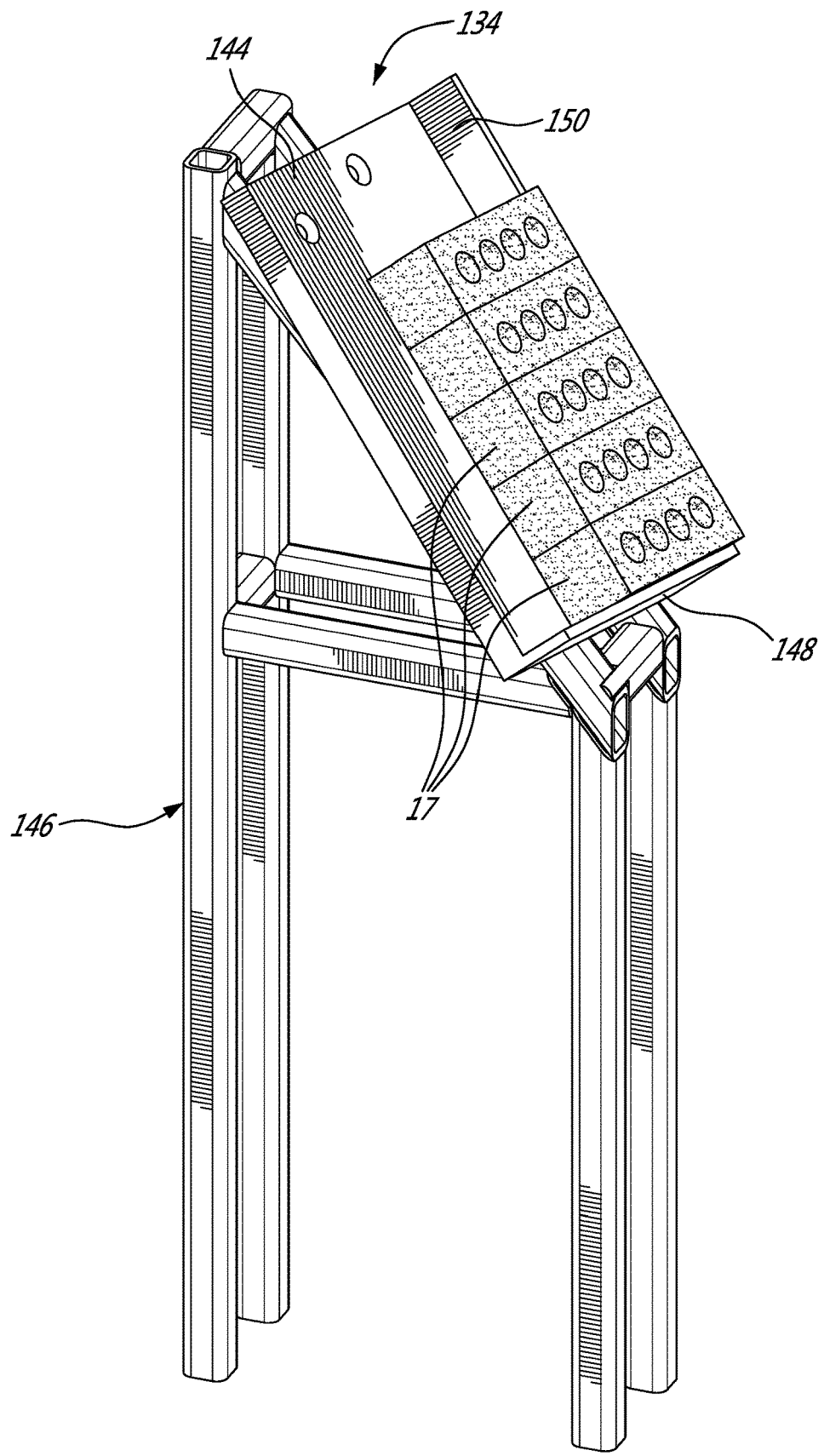

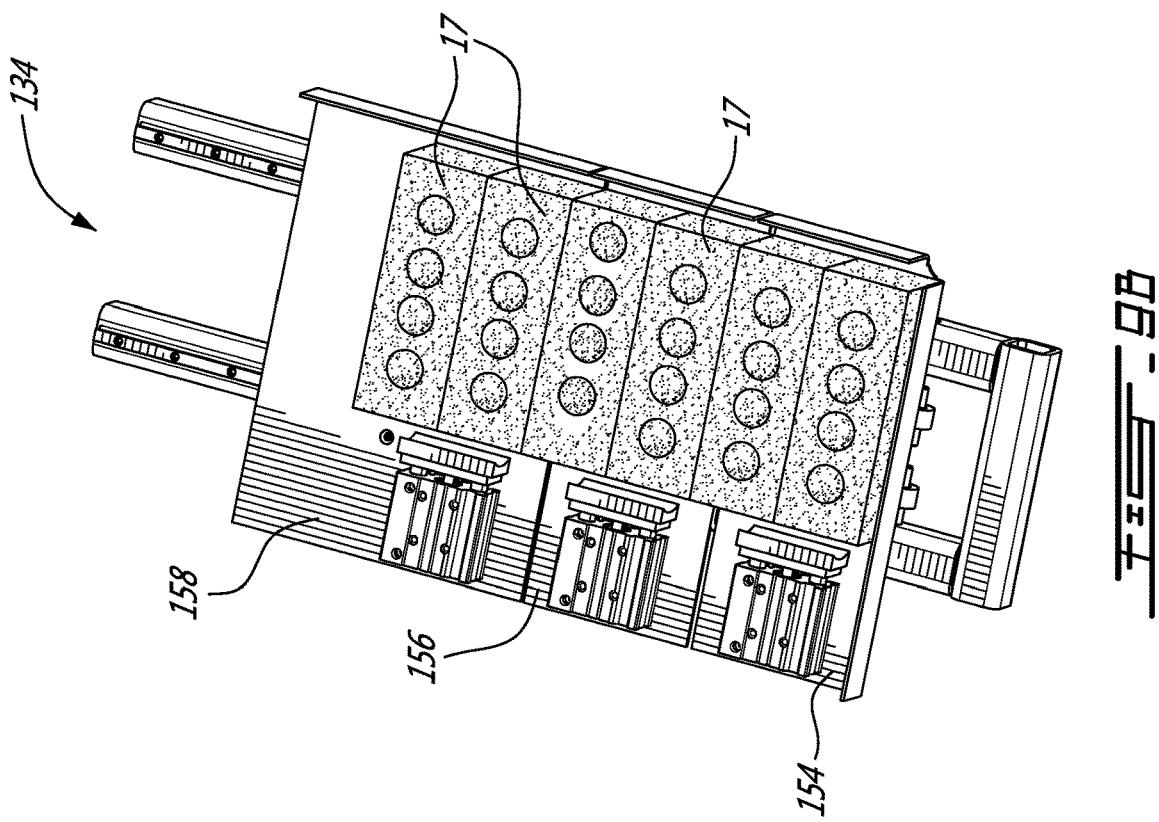
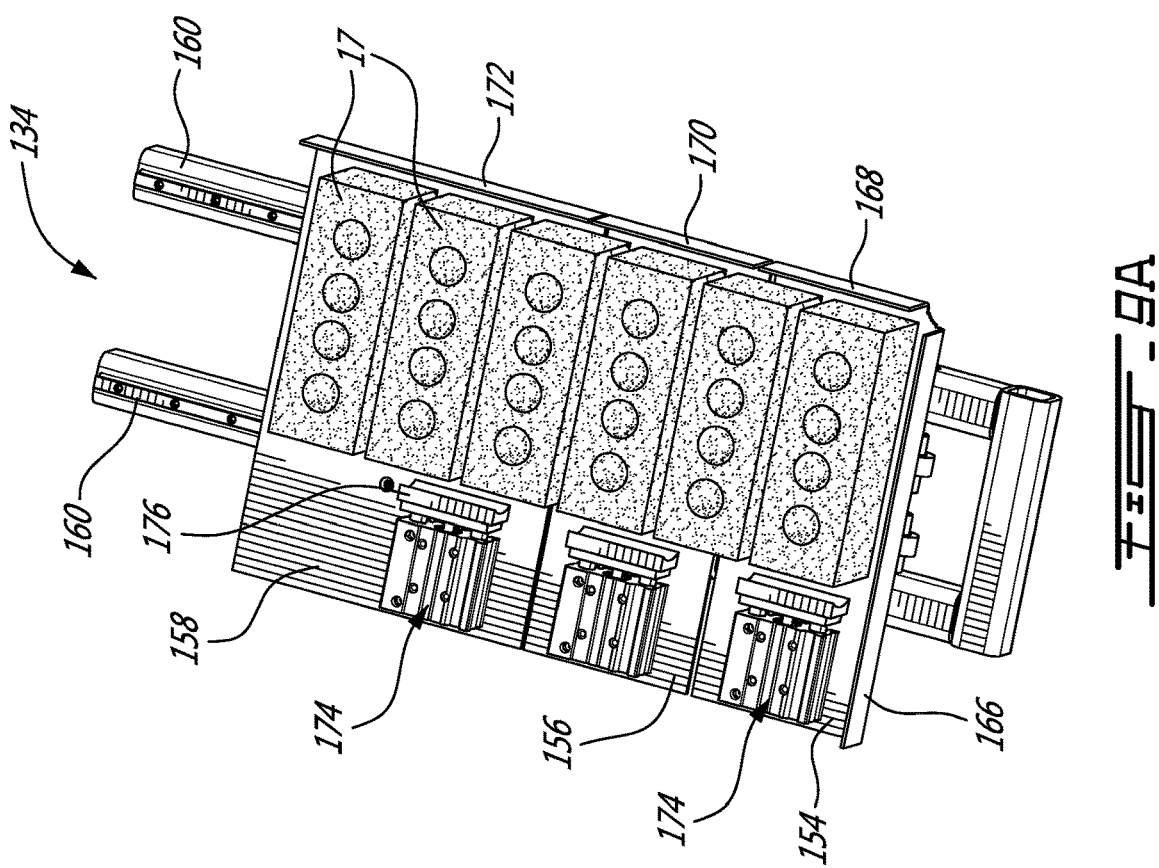

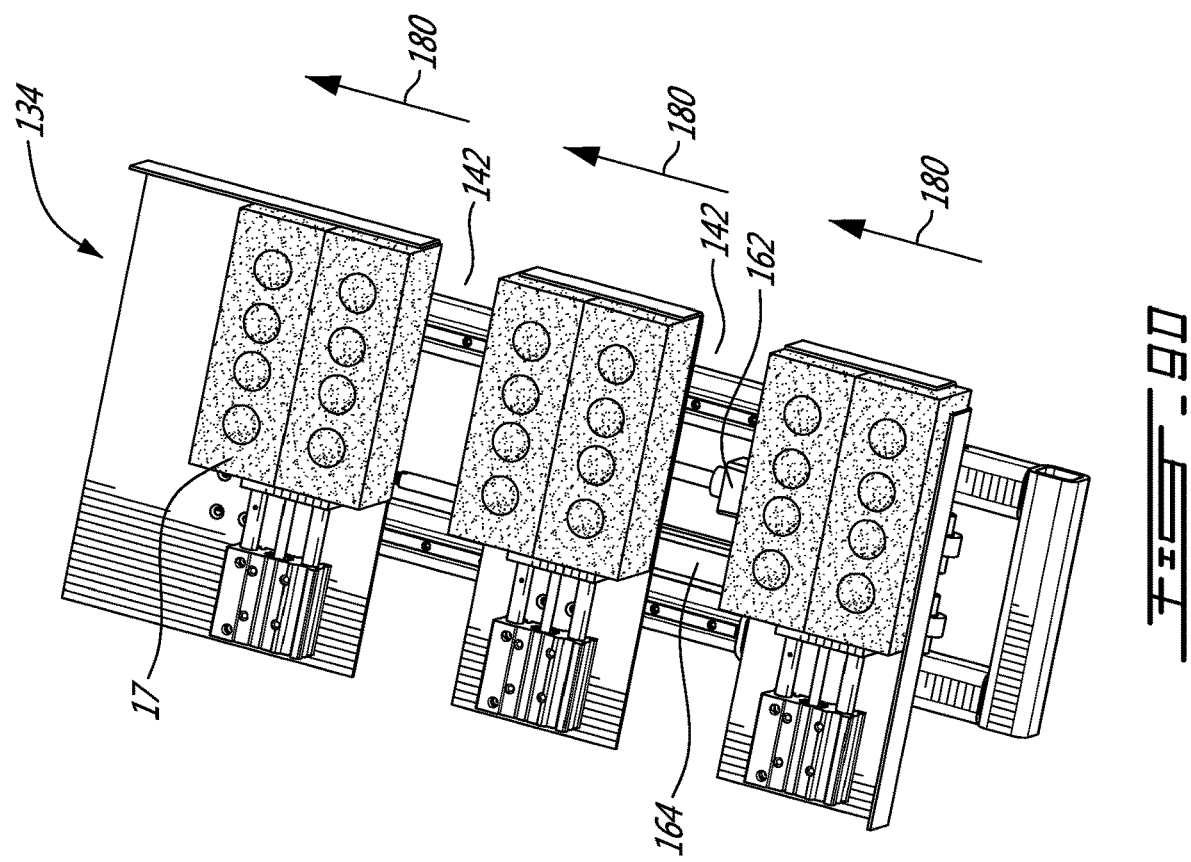
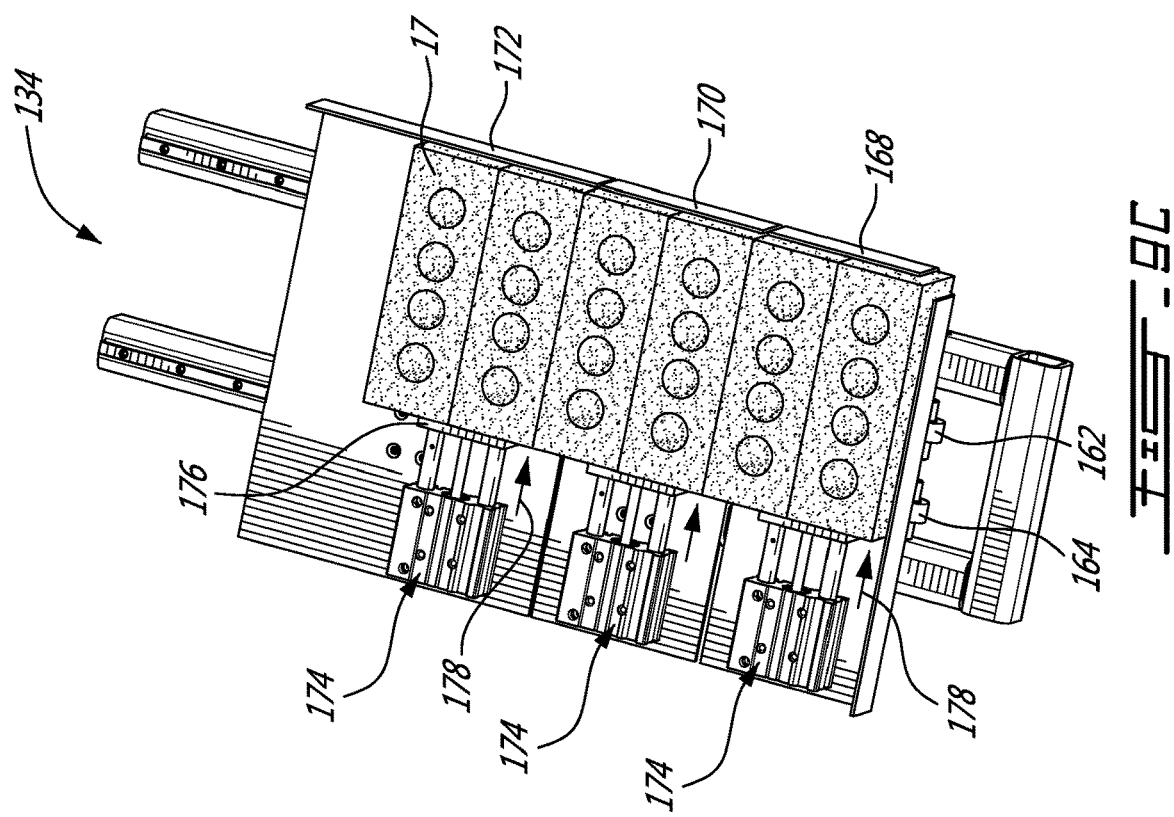

BRICK LAYERING SYSTEM

CROSS REFERENCE TO RELATED PATENT APPLICATION

This application claims the benefit of Canadian Application No. 2,951,663, filed on Dec. 14, 2016, the content of which is incorporated by reference herein.

FIELD

The present disclosure concerns brick manufacturing and handling. More specifically, the present disclosure is concerned with a brick layering system.

BACKGROUND

Following their manufacture, bricks are conventionally deposited in layers on a pallet or on a conveyor for transport or further processing. The bricks are layered in a relatively ordinate manner, usually in rows oriented in a same direction within a same layer, but oriented in perpendicular directions from one layer to the next or every two or more rows for stability purposes. The package brick arrangement coming out of the oven is often referred to as "bong" or "hack".

The positioning of bricks conventionally includes gaps that are introduced during the brick manufacturing processes (setting machine, firing, burning, drying). The bricks positioning during and following their production is done with a setting machine creating gaps and interlocks. Throughout the handling, firing and drying processes, the bricks change shapes, moves, sometime breaks and their position therefore becomes imprecise. Such imprecision has been found to cause mispositioning or mishandling thereof in their subsequent use, resulting in frequent crumbling of bongs and/or resulting breakage of bricks and a non-negligible rejection rate. It also results in a reduced productivity by increasing manual packaging cycle time.

Furthermore, the gaps within conventional piles of bricks result in an additional and unnecessary volume for the pile, which furthermore cannot be packaged conventionally (strapped or wrapped), which increases the shipping costs.

SUMMARY

According to an illustrative embodiment, there is provided a system for compacting a brick layer, the system comprising:

a support frame;

a table top mounted to the support frame and having a generally flat surface for receiving the brick layer; and two mechanical stop assemblies secured to the table top on the generally flat surface thereof so as to define two straight edges on the table top that are perpendicular to each other; the table top being mounted to the support frame so that a virtual intersection of both straight edges is lower than any other parts of the two straight edges;

whereby, in operation, bricks within the brick layer that is received on the flat surface of the table top are moved by gravity towards the virtual intersection of the two straight edges, thereby removing gaps between the bricks and indexing the bricks relative to both straight edges.

According to another embodiment, there is provided a brick layering system comprising:

at least one system for compacting a brick layer as recited above; and at least one brick layer gripping system within operational reach of the at least one system for removing gap in a brick layer.

According to still another illustrative embodiment, there is provided a method for removing gap in a layer of bricks that comprises dropping the layer of bricks on an incline having two straightedges mounted thereon and that are perpendicular to each other; the incline is such that a virtual intersection of both straightedges is lower than any other parts of the two straightedges on the incline.

According to a further illustrative embodiment, there is provided a system for rearranging a brick layer comprising:

a system for compacting a brick layer as recited above, wherein the table top is defined by a plurality of consecutive and parallel table portions; the table portions being relatively movable along a first axis that is parallel to a first one of the two straight edges so as to modify spacings between each two adjacent table portions; and a pusher, mounted to each of the table portions, that is movable along a second axis that is parallel to a second one of the two straight edges;

whereby, in operation, after having been moved by gravity towards the virtual intersection of the two straight edges, i) a force is applied by the pusher on the bricks within the brick layer so as to bias the bricks towards the first one of the two straight edges, ii) gaps are created along the first axis between some adjacent bricks by relatively moving the table portions therealong, and iii) the force is maintained on the bricks by the pusher until the brick layer is removed from the table top.

Other objects, advantages and features of embodiments of a system for compacting a brick layer and of brick layering and layer-rearranging systems including such a compacting system will become more apparent upon reading the following non-restrictive description of preferred embodiments thereof, given by way of example only with reference to the accompanying drawings.

BRIEF DESCRIPTION OF THE DRAWINGS

In the appended drawings:

FIG. 5 is a back elevation of the table portion of the brick layer compacting system from FIG. 2;

FIGS. 6A-6E are front elevations of the table portion of the brick layer compacting system from FIG. 2, illustrating the operation thereof;

FIGS. 8A and 8B are perspective partly schematic views of a brick layer compacting system according to a second illustrative embodiment, shown respectively with a row of bricks before and after removal of gaps therein; and FIGS. 9A to 9D are perspective views of a brick layer rearranging system according to a first illustrative embodiment, illustrating the operation thereof; the system being part of the brick layering system of FIG. 7.

DETAILED DESCRIPTION

Figure 1:
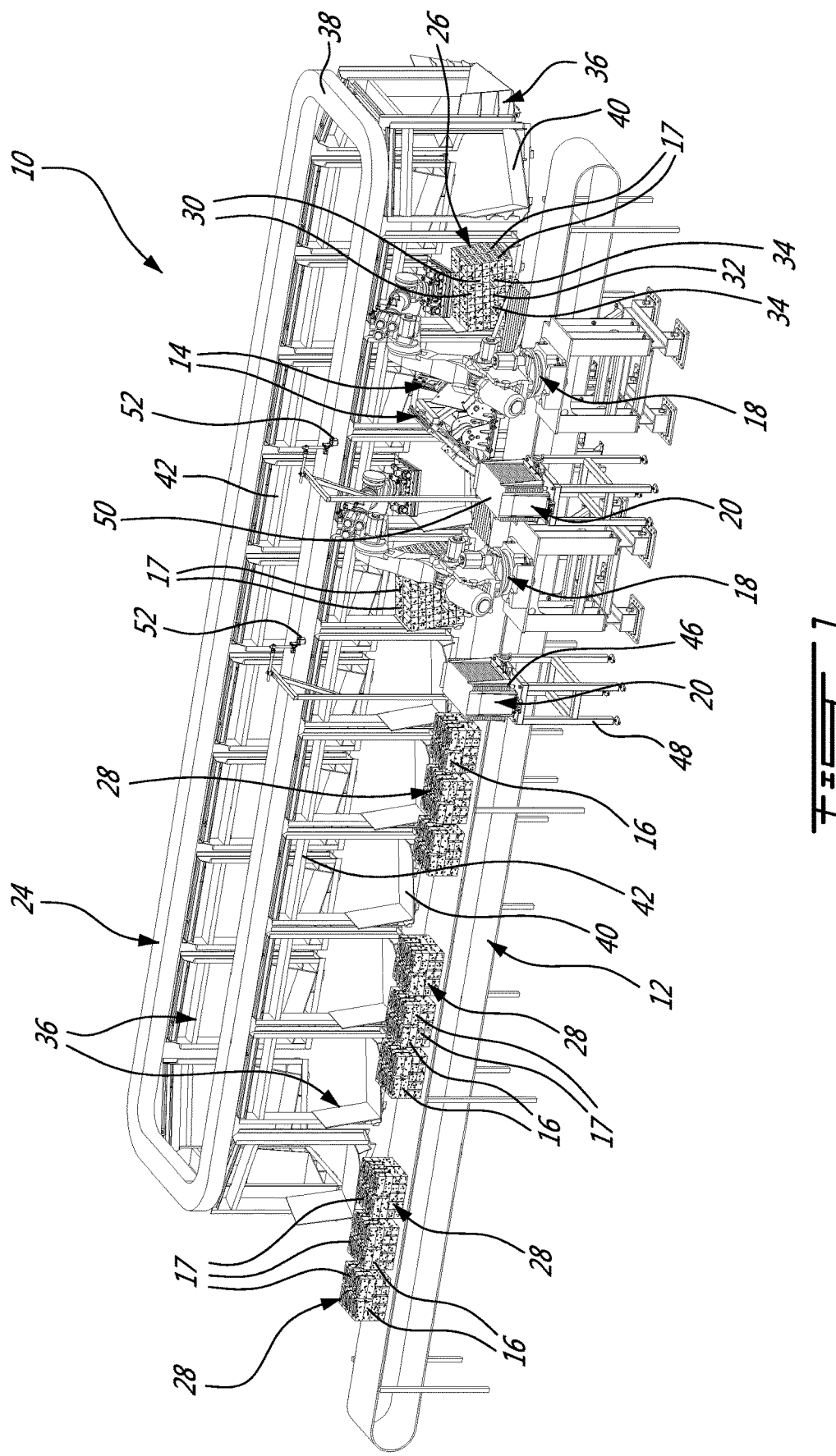
FIG. 1 is a perspective partly schematic view of a brick layering system according to a first illustrative embodiment.

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, un-recited elements.

A brick layering system 10 according to a first illustrative embodiment will now be described with reference to FIG. 1.

The brick layering system 10 comprises an infeed conveyor 12, two independent systems 14 for compacting a brick layer 16, each paired with respective robot arm 18 and slip-sheet dispenser 20, and an outfeed monorail 24 for receiving organized piles 26 of bricks.

The input of the system 10 are bongs 28, for example coming out of the oven, that can have one or more rough layers 16 therein. All bricks 17 in a layer 16 are generally parallel, but such is not necessarily the case for two (2) bricks 17 in different layers 16. The layers 16 are said to be rough since the bricks 17 therein are not precisely positioned.

The output of the system 10 are organized piles of bricks 26 formed from a plurality of layers 30 and 32 that are either generally continuous (layers 30) or that includes predetermined spacings 34 therein (see layers 32). Such spacings 34 allows forks or other similar components of a machinery to be inserted within the output pile(s) 26. As will be described hereinbelow in more detail, the output piles 26 include layers 30 and 32 of bricks 17 that are free of unwanted gaps.

The infeed conveyor 12 can be any type of conveyor, including without limitations a belt conveyor, a chain conveyor, etc. The infeed conveyor 12 brings the input piles 28 of bricks 17 within reach of the robot arms 18.

The outfeed monorail 24 includes a plurality of supports 36 for receiving the organized piles of bricks 26. The supports 36 are slidably mounted to an elongated O-shaped track 38 so as to be movable therealong in unison.

Each support 36 includes an L-shaped brick layer-receiving bed 40 that is mounted in a frame 42 that is in turn mounted to the track 38 via sliding members (not shown).

According to another embodiment (not shown), any one or both of the conveyor 12 and monorail 24 are replaced by an output table, a cart or any other means adapted to receive the piles of bricks 26-28. According to still another embodiment, anyone of the conveyor 12 and monorail 24 is replaced by a plurality of conveying means.

Since conveying systems are believed to be well known in the art, they will not be described herein in more detail for concision purposes.

The robot arms 18 are in the form of conventional robot arms. The arms 18 are equipped with a vacuum gripper 44.

The vacuum gripper 44 is configured for selectively picking and releasing a layer of bricks 16, 30 or 32, including or not spacings, slip-sheets or wood or plastic boards therebetween. For example, the vacuum gripper 44 can be a universal foam type gripper.

According to another embodiment (not shown), the vacuum gripper 44 is replaced by a clamping or squeezing device or by another type of gripper.

Since the operations of a robot and of a vacuum gripper are believed to be well known in the art, they will not be described herein in more detail for concision purposes.

Each slip-sheet dispenser 20 includes a slip-sheet receiving rack 46 mounted on a table 48 that is loaded with a pile of slip-sheets 50. The rack 46 includes a bottom (not shown) that automatically raises so that the top-most slip-sheet 50 in the rack 46 is positioned at the highest level of the rack 46, where it can be gripped by the robot arms 18 associated thereto.

According to another embodiment, another mechanism than the illustrated dispenser 20 is provided to dispense slip-sheets, such as a rack having a fixed bottom. According to still another embodiment the slip-sheet dispensers are omitted. According to still another embodiment (not shown), the slip-sheets are replaced by other types of separators, such as wood veneer, foam and plastic mesh pieces.

Since slip-sheet dispensers are believed to be well-known in the art, they will not be described herein in more detail for concision purposes.

The system 10 further includes a couple of vision systems, in the form for example of cameras 52, each mounted to a pole assembly 53 so as to aim at a portion of the infeed conveyor 12 adjacent a respective robot arm 18. More specifically, each vision system 52 is positioned above a portion of the conveyor 12 where an associated robot arm 12 is intended to grip the top layer 16 of bricks 17 from a pile of bricks 28. The vision systems 52 are coupled to a controller (not shown) and are configured to detect the presence and position of the top layer 16 from the pile 28.

The vision systems 52 are not limited to cameras and can include other types of sensors, such as a laser-based system, an ultrasound system, etc.

It is to be noted that the system 10 further includes a vacuum pump for the gripper and controller(s) for the robot arms 20, conveyor 12, monorail 24, and dispenser 20 which are not shown so as to alleviate the views.

Figure 2:
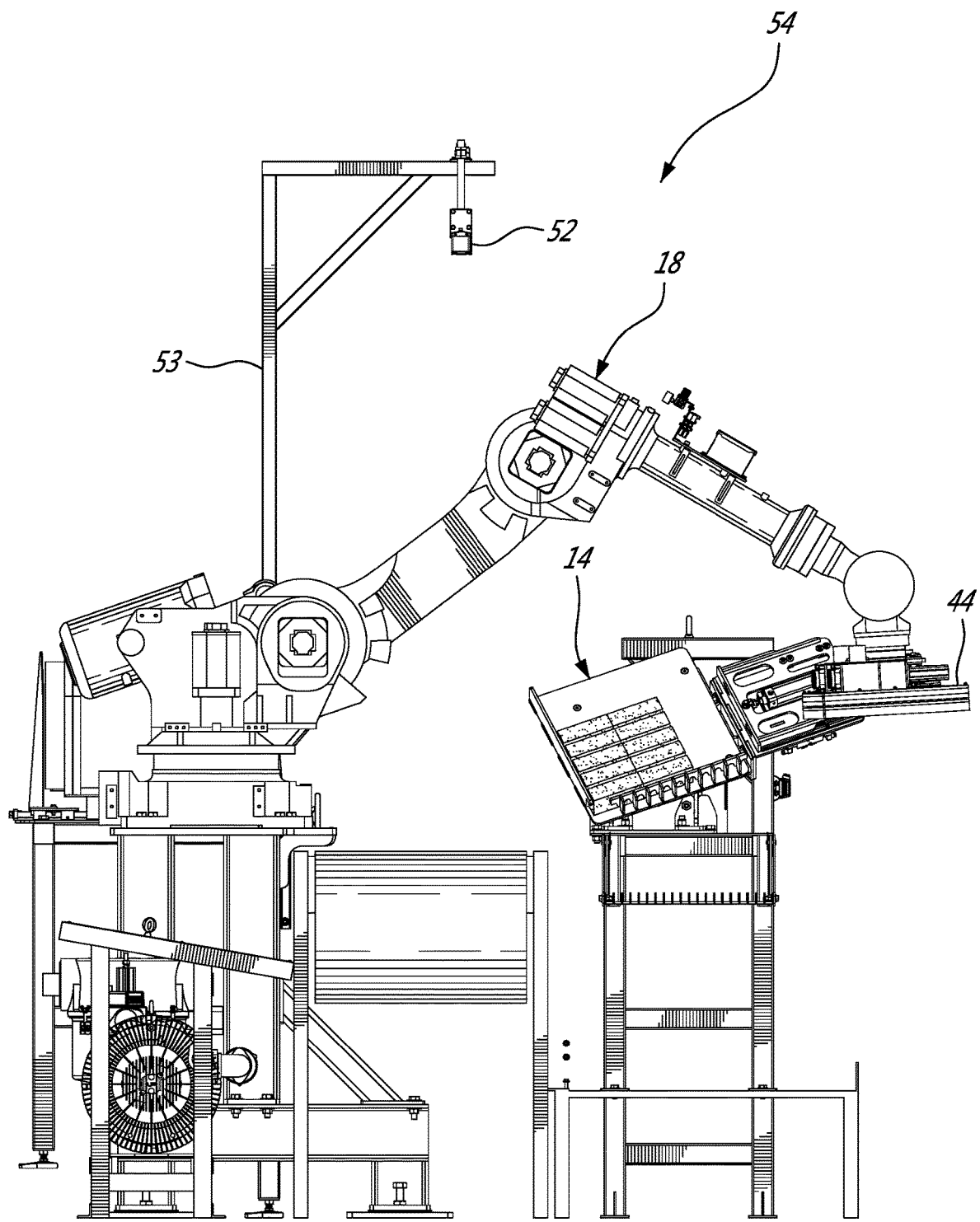
FIG. 2 is a front elevational and isolated view of a brick layer gripping system and of a brick layer compacting system according to a first illustrative embodiment, both system being parts of the brick layering system of FIG. 1.

As mentioned hereinabove and as shown in FIG. 2, each of the two (2) independent systems 14 for compacting a rough layer 16 of bricks 17 is associated with a respective robot arm 18, a slip-sheet dispenser 20 and the outfeed monorail 24, the ensemble forming a brick layering cell 54. In operation of each cell 54, the robot arm 20 independently a) grips a rough layer 16 or a section thereof from a pile 28 on the infeed conveyor 12 using its tool 44, b) releases the layer 16 on a respective system 14, c) the system 14 removes gaps within the layer 16, d) the robot 20 grips the gap-free layer 30 from the system 14 and move it in a selected pile 26 in the carousel.

It is to be noted that the brick layering system 10 can include a different number of brick layering cells 54 than two (2).

According to another embodiment (not shown), anyone or both of the robot arms 12 are replaced by a gantry system, a human equipped with an exoskeleton or by any manipulation means equipped with a tool suitable to pick at least a row of bricks.

Figure 3:
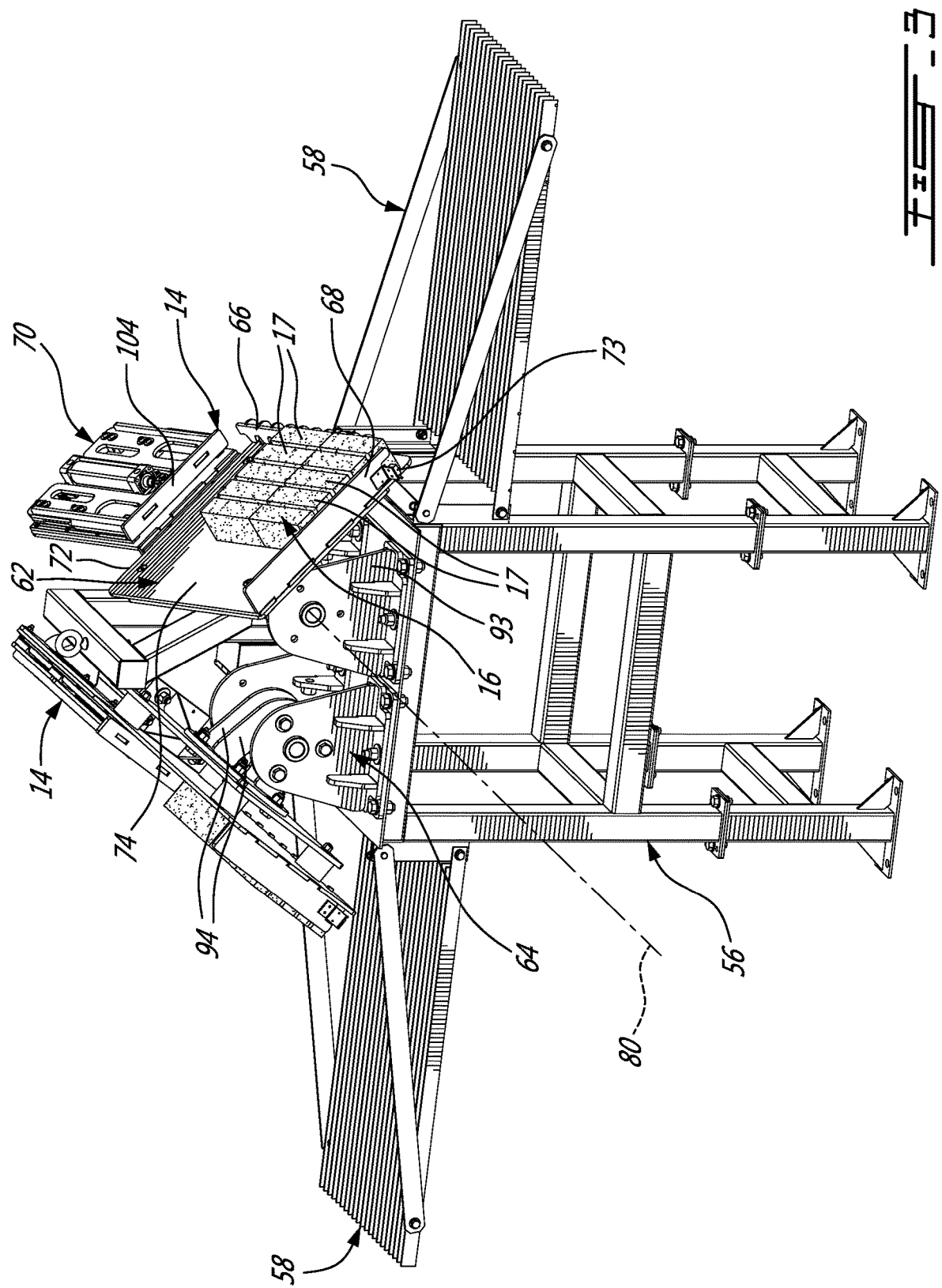
FIG. 3 is a perspective view of back to back brick layer compacting systems from FIG. 1.

As can be seen in FIG. 3, the two-brick layer compacting systems 14 are mounted back to back on a same support frame 56. The support frame 56 is in the form of a table onto which are mounted the systems 14.

Two buffer stations, in the form of grated tables 58, are mounted to the support frame 56 on opposite sides thereof so that each of the grated tables 58 is adjacent a respective system 14. The buffer stations 58 allows temporarily receiving a layer of bricks 16 or 30 after processing by the systems 14, in case of input irregularity, so as not slowing the packaging line (not shown).

The longitudinal openings 60 within the tables 58 allows any sufficiently small debris from the layer 16 or 30 to fall thereunder.

The buffer stations 58 are not limited to the illustrated embodiment. For example, the grating defining the tables 58 can be replaced by a mesh or a panel (not shown). According to other embodiments (not shown), the buffer stations are omitted.

The support frame 56 can take any form allowing to raise and more generally position the systems 14 relative to the robot arms 18. Also, each brick layer compacting system 14 can be mounted to a separate support.

Figure 4:
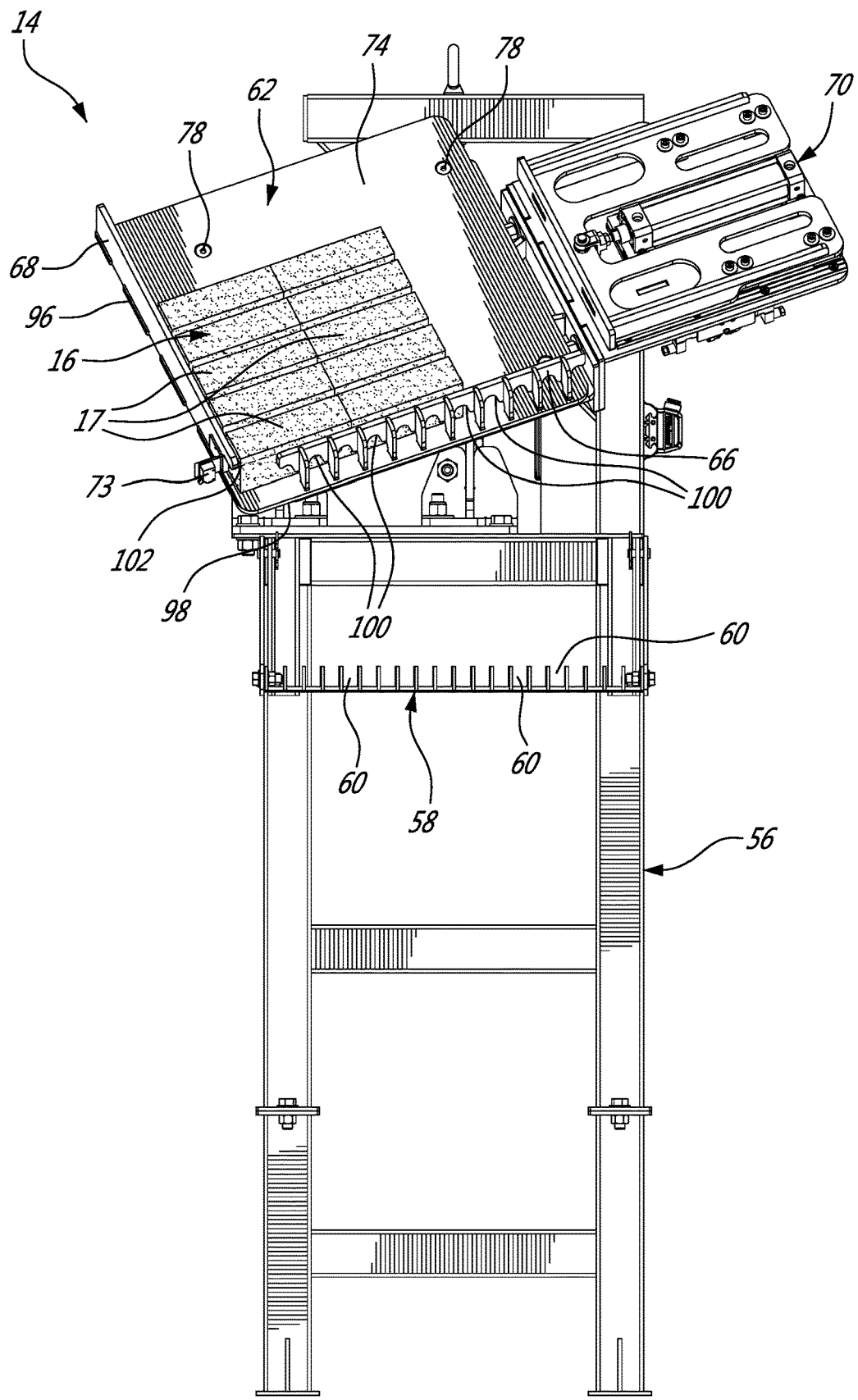
FIG. 4 is a front elevation isolated view of the brick layer compacting system from FIG. 2.

One of the two identical brick layer compacting systems 14 will now be described with reference to FIGS. 3 to 5.

The system 14 comprises a generally rectangular table top 62 mounted to the support frame 56 via an angle-adjusting mechanism 64, two mechanical stops, defined by straight bars 66 and 68 that are secured to the table top 62, a pusher assembly 70 secured to the side thereof 72 opposite one of the two mechanical stops 66 and 68, and a photocell 73, secured to the table top 62 adjacent a virtual intersection of both mechanical stops 66 and 68.

The table top 62 defines a top flat surface 74 for receiving a rough layer 16 of bricks 17.

The angle-adjusting mechanism 64 is in the form of an azimuthal mount that is fixedly mounted to the support frame 56. The table top 62 is mounted to the azimuthal mount 64 via a panel 76 that is fixedly mounted to the azimuthal mount 64. The table top 62 is secured to the panel 76 via vibration mounts 78 so that the panel 76 and table top 62 are in a parallel relationship.

According to another embodiment (not shown), the table top 62 is directly mounted to the azimuthal mount 64.

As it is well-known to a person skilled in the art, the azimuthal mount 64 allows pivoting the table top 62 about a first pivot axis 80 relative to the support frame 56 and about a second pivot axis 82 relative to the first pivot axis 80.

The first pivot axis 80 is defined by a rod 92 that is pivotably mounted to the support frame 56 via two bracket elements 93 therebetween. The axial position about the first axis 80 is locked by fasteners 81 on the brackets 93. According to another embodiment, other fastening means are provided.

The second pivot axis 82 is defined by the center of a disk 90 that is fixedly mounted to the rod 92 via bracket elements 94. The axial position of the table top 62 about the second axis 82 is locked using fasteners 88 that fixedly mount the flat panel 76 to radially registered arcuate openings 89 within the disk 90.

While the arcuate openings 89 allows for a pivoting range of a few degrees, longer openings can alternatively be provided when a greater range is desired.

According to a further embodiment (not shown), controlled actuators are used to modify the angles of the table top 62

The two (2) mechanical stops 66 and 68 are in the form of straight bars that are secured to the table top 62 along two adjacent edges 96-98 therefrom so as to be perpendicular to each other. Each straight bar 66 and 68 defines a straight-edge.

The straightedge 66 that is intended to be lower than the other edge 68 when the system 14 is in operation is provided with apertures 100 therein that are intended to allow passage for any debris left by the bricks 17 (not shown).

The angles of the table top 62 are adjusted as described hereinabove so that a virtual intersection 102 of both straight bars 66-68 is lower than any other parts of the two straight bars 66-68 (see on FIG. 4). Such an inclination of the table top 62 forces bricks 17 within a layer 16 towards both straight bars 66 and 68 under the force of gravity, removing any gap therebetween when the bricks 17 within the layer 16 are generally oriented along a same axis.

The table top 62 inclination about both pivot axes 80-82 is determined to minimize friction between the bricks 17 and the surface 74 so as to yield a smooth sliding of the bricks 17. According to the first illustrative embodiment, the angle of the table top 62 with the horizontal is about 54 degrees and the tilt of the straight bar 68 relative to the vertical is about 28 degrees. An embodiment of the brick layer compacting system is not limited to those angles, which can range between 0 and 90 degrees.

The table top 62 is made for example of a low friction material, such as without limitations ultra-high-molecular-weight polyethylene, Hardox® and Teflon®, Nylon®.

The pusher assembly 70 is secured to the table top 62 on a side thereof 72 opposite the straight bar 68 and includes a pusher 104 that is parallel to and movable towards the straight bar 68 so as to force bricks 17 on the table top 62 to be moved towards the straight bar 68. This force is in addition to gravity.

With reference to FIGS. 5 and 6C, the pusher assembly 70 will now be described in more detail.

The pusher assembly 70 comprises a bottom rectangular plate 106 that is fixedly mounted to the panel 76 via a mounting assembly 108 so as to be generally parallel to the panel 76, and a top rectangular plate 110 that is slidably mounted to the bottom plate 106 for reciprocal movement thereon in a parallel relationship towards and away the straight bar 68. The pusher 104 is in the form of a straight bar 104 that is secured to the top rectangular plate 110 at the edge 112 thereof that faces the straight bar 68.

The top plate 110 is mounted to the bottom plate 106 via sliding members, such as without limitation rollers (not shown) in tracks 114. A cylinder 116 is mounted to both top and bottom plates 110 and 106 therebetween for actuating the sliding movement of the top plate 110 relative to the bottom plate 106. The operation of the cylinder 116 is controlled by the system controller (not shown).

According to another embodiment (not shown) the pusher 104 is mounted to the table top 62 and operated differently than illustrated. Also, the pusher is not limited to being in the form of a bar or straightedge and any other element that have a portion that can abut onto facing bricks 17 on the table top 62 in a generally parallel relationship and that is movable towards the straight bar 68 can be used.

Also, the mechanical stops 66 and/or 68 can have any other form than straight members, as long as they define together virtually intersecting surfaces that can stop the fall of bricks 17 onto the table top 62 without modifying the alignment of the bricks 17. For example, two series of aligned elements (not shown) such as rollers, each series defining a straightedge, can be provided on the table top 62.

The photocell 73 is secured to the table top 62 near the virtual intersection of both straight bars 66-68 and is aimed towards the pusher 104. The photocell 73 is coupled to the controller and allows detecting the presence or absence of bricks 17 on the table top 62.

The photocell 73 can be omitted or substituted by other types of sensors such, as without limitations, ultrasound transducer, range finder, laser, camera, and load cell.

It is to be noted that connectors, cables, and other secondary or non-mechanical components of the system 10 have been omitted in the figures so as to alleviate the views.

The operation of the brick layer compacting systems 14 will now be described with references to FIGS. 6A to 6E.

A rough layer 16 of bricks 17 is first deposited by the robot arm 18 on the table top 62 (see FIG. 6A). While the bricks 17 are shown in FIG. 6A as including constant spacings 118-120 therebetween, such is usually not the case and the gaps width may vary from a section of the layer 16 to the other.

With reference to FIG. 6B, the effect of gravity automatically causes the bricks 17 to simultaneously move towards both mechanical bars 66 and 68 (only the movement of the bricks 17 towards the bar 66 is shown in FIG. 6B—see arrow 122).

As shown in FIG. 6C, sometimes a brick may be prevented by friction from being moved into abutment with an adjacent brick. The pusher assembly 70 is activated so that the pusher 104 forces all bricks 17 towards the opposite straight bar 68 (see arrow 124 in FIG. 6C). The pusher 104 then retracts away from the straight bar 68 (see arrow 126 in FIG. 6D).

The operation of the system 14 yields a layer 30 that is free of gaps between the bricks 17. Furthermore, since the layer 30 is abutted onto both straight bars 66-68, its position is from now on precisely known by the system 10, which can be useful for precise subsequent handling and processing thereof. The position of the bricks 17 are said to be indexed.

In some embodiment, the pusher assembly is omitted or replaced by another system for squeezing the bricks.

While the operation of the brick layer compacting system 14 is illustrated with reference to the processing of brick layers 16 having two by five bricks 17 therein, the system 14 can be used and/or adapted to organize a different number and arrangement of bricks 17.

Returning to FIG. 1, it is to be noted that the output layers 32 that include spacings 34 therein are created manually according to the first illustrative embodiment.

A brick layering system 130 according to a second illustrative embodiment will now be described with reference to FIG. 7. Since the system 130 is similar to the system 10, only the differences therebetween will be described herein in more detail for concision purposes.

As a first such difference, the outfeed monorail 24 is replaced by an outfeed conveyor 12' identical to the infeed conveyor 12.

Figure 7:
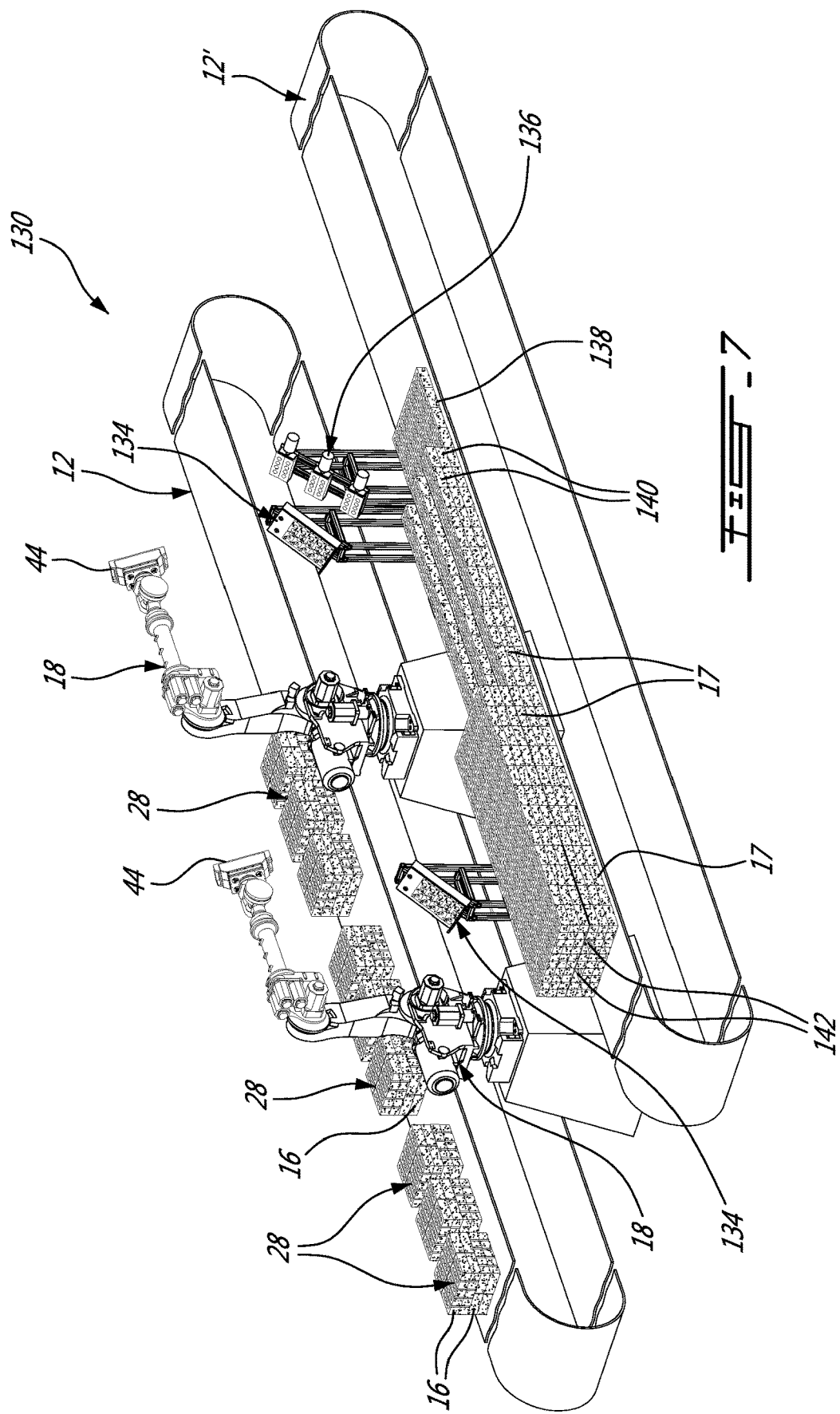
FIG. 7 is a perspective view of a brick layering system according to a second illustrative embodiment.

The slip-sheet dispensers 20 are omitted in FIG. 7. However, one or more such systems can be provided in the brick layering system 130.

Each system 14 from FIG. 1 is substituted in FIG. 7 by a brick layer compacting system 134 according to a second illustrative embodiment.

The brick layering system 130 further a system 136, positioned adjacent one of the two systems 134, for rearranging a brick layer.

The output of the system 130 is a continuous or discontinuous pile of bricks 17 formed from a plurality of layers 138 and 140 that are either generally continuous (layers 138) or that includes predetermined spacings 142 therein (see layers 140). Such spacings 142 allows forks or other similar components of a machinery to be inserted within the output pile(s).

The brick layer compacting system 134 will now be described in more detail with reference to FIGS. 8A and 8B.

The system 134 includes a slanted rectangular plate 144 that is secured to a trestle 146 using for example welding or fasteners. The lower longitudinal edge of the plate 144 is provided with a first flange 148 that defines a first mechanical stop. Similarly, one of the lateral side edge of the plate 144 is provided with a second flange 150 that defines a second mechanical stop.

The plate 144 is so mounted to the trestle 146 as to define a first angle of about sixty (60) degrees with the horizontal. The plate 144 is further titled from a second angle of about thirty (30) degrees from the vertical towards its side that includes the second flange 150.

A person skilled in the art will now appreciate that when a row of bricks 17 including gaps therebetween is deposited onto the surface 144, the bricks 17 will automatically be moved one against the other and biased towards both flanges 148-150 under the force of gravity (see FIG. 8B) as described hereinabove with reference to the system 14.

In addition to removing any gaps 152 between two adjacent bricks 17, the bricks 17 becomes registered with the side flange 150. Knowing the exact position of the side flange 150 and dimension of the bricks 17 allows the robot arm 18 to precisely know the position of the row of bricks 17 that can then be picked up by the arm 18 with tool 44 for precisely positioning on the outfeed conveyor 12'.

It is to be noted that the first and second angles can be varied depending, for example, on the shape, size or texture of the bricks 17, and on the configuration and size of the row of bricks 17 picked up on the infeed conveyor 12.

According to another embodiment (not shown), the plate 144 is in the form of a screen or includes apertures to contribute clearing debris or dust deposited by the bricks 17 thereon. Also, the flanges 148 and 150 are not limited to being flat rectangular portions extending along the full length of the respective side of the plate 144. For example, any one of the flange 148 and 150 may extend only from a portion of the respective side. According to still another embodiment (not shown), one or both flanges 148 and 150 includes apertures. The trestle 146 can be of any shape and size.

Also, the flanges 148 and 150 can be replaced or complemented for example by protrusions, pins, bumps, rollers, and or brushes.

With reference now to FIGS. 9A to 9D, an illustrated embodiment of a brick layer rearranging system 136 will now be described.

The system 136 comprises a plurality of plates 154-158 that are slidably mounted to a supporting structure such as a trestle 146. More specifically, the system 136 includes a pair of tracks 160 that slidably receives the plates 154-158 via cursors (not shown) which are secured to the plates 154-158 thereunder. The middle and higher plates 156 and 158 are slidably movable towards and away the lowest plate 154 via a respective cylinder 162 and 164 mounted therebetween.

The lowest longitudinal edge of the plate 154 is provided with a first flange 166 that defines a first mechanical stop. A same lateral side edge of each plate 154-158 is provided with a lateral side flange 168-172, together defining a second mechanical stop.

The height of the plates 168-172 are such as to be generally the same as the total width of two contiguous bricks 17, the reason of which will become more apparent hereinbelow.

A cylinder 174 equipped with a contact pad 176 is secured to each plate in such a way that the contact pad 176 is movable towards and away the respective lateral flange 168-172.

The operation of the gap creating subsystem 136 is as follows.

A row of bricks 17 is deposited by the robot arm 18 onto the plates 154-158 (see FIG. 9A). It is to be noted that the plates 154 and 158 are then positioned contiguous by the cylinders 162 and 164.

As described with reference to the system 134, the bricks 17 on the contiguous plates 154-158 automatically moves one against the other and are biased towards the bottom flange 166 under the force of gravity (see FIG. 9B).

With reference to FIG. 9C, the cylinders 174 are then actuated, causing their contact pads 176 to force the bricks 17 laterally in contact with the side flanges 168-172 (see arrows 178).

While the biasing force continues to be exerted onto the bricks 17 (arrows 178 on FIG. 9C) by the cylinders 174, the two cylinders 160 and 164 are actuated to separate the plates 154-158 a predetermined distance and create predetermined gaps 142 between the bricks (see arrows 180).

The robot arm 18 is then used to move and activate its tool 44 onto the bricks 17 while they are maintained in position in the system 136.

While the vacuum gripper 44 holds its grip onto the bricks 17, the cylinders 174 are retracted from the bricks 17 and the arm 18 can then move the bricks 17 in the resulting configuration at a selected position onto the outfeed conveyor 12'.

The brick layer rearranging system 136 can of course be modified to receive more or less bricks 17 than illustrated or to receive bricks having different geometry than shown. Moreover, the system 136 can be adapted and/or controlled to create gaps differently than shown.

As will now become more apparent to a person skilled in the art, the gap creating system can be seen as a system for layer rearranging a brick layer that is based on a gap-removing system as described herein, wherein the table top is defined by a plurality of consecutive and parallel table portions.

Although brick layering, layer-compacting and layer-rearranging systems have been described hereinabove by way of illustrated embodiments thereof, they can be modified. It is therefore to be understood that numerous modifications may be made to the illustrative embodiments and that the scope of the claims should not be limited by the preferred embodiment, but should be given the broadest interpretation consistent with the description as a whole.

What is claimed is:

1. A system for compacting a brick layer, the system comprising:
    a support frame;
    a table top mounted to the support frame and having a generally flat surface for receiving the brick layer; and
    two mechanical stop assemblies secured to the table top on the generally flat surface thereof so as to define two straight edges on the table top that are perpendicular to each other; the table top being mounted to the support frame so that a virtual intersection of both straight edges is lower than any other parts of the two straight edges;
    wherein at least one of the two mechanical stop assemblies includes a straight bar having openings therein that extend up from the generally flat surface to allow passage for brick debris;
    whereby, in operation, bricks within the brick layer that is received on the flat surface of the table top are moved by gravity towards the virtual intersection of the two straight edges, thereby removing gaps between the bricks and indexing the bricks relative to both straight edges.

2. The system as recited in claim 1, wherein the table top is mounted to the support frame via an angle-adjusting assembly that allows modifying an orientation of the table top relative to the support frame.

3. The system as recited in claim 2, wherein the angle-adjusting assembly includes an azimuthal mount.

4. The system as recited in claim 1, wherein at least one of the two mechanical stop assemblies includes elements that are aligned to form one of the straight edges.

5. The system as recited in claim 1, further comprising a pusher mounted to the table top so as to be generally parallel to one of the two straight edges; the pusher being movable towards and away said one of the two straight edges.

6. The system as recited in claim 1, further comprising a sensor mounted to the table top to detect the brick layer on the table top.

7. The system as recited in claim 1, wherein at least one of the two mechanical stop assemblies includes a flange of the table top.

8. A brick layering system comprising:
    at least one system for compacting a brick layer as recited in claim 1; and
    at least one brick layer gripping system within operational reach of the at least one system for compacting a brick layer for moving the brick layer in and out of the at least one system for compacting a brick layer.

9. The brick layering system as recited in claim 8, further comprising at least one of a brick layer infeed system for bringing brick layer within reach of the at least one brick layer gripping system and at least one brick layer outfeed system within reach of the at least one brick layer gripping system for receiving therefrom the brick layer after compaction by the at least one system for compacting a brick layer.

10. The brick layering system as recited in claim 9, wherein at least one of the at least one brick layer infeed and outfeed systems is a conveyor, a monorail or a carousel.

11. The brick layering system as recited in claim 8, further comprising at least one slip-sheet dispenser positioned within operational reach of the at least one brick layer gripping system.

12. The brick layering system as recited in claim 8, wherein the at least one brick layer gripping system includes a robot arm equipped with a gripping tool.

13. The brick layering system as recited in claim 12, wherein the gripping tool is a vacuum gripper.

14. A system for rearranging a brick layer comprising:
    a support frame;
    a table top mounted to the support frame and having a generally flat surface for receiving the brick layer; and
    two mechanical stop assemblies secured to the table top on the generally flat surface thereof so as to define two straight edges on the table top that are perpendicular to each other; the table top being mounted to the support frame so that a virtual intersection of both straight edges is lower than any other parts of the two straight edges;

wherein the table top is defined by a plurality of consecutive table portions; the table portions being relatively movable along a first axis that is parallel to a first one of the two straight edges so as to modify spacings between each two table portions that are adjacent; and a pusher, mounted to each of the table portions, that is movable along a second axis that is parallel to a second one of the two straight edges;

whereby, in operation, bricks within the brick layer that is received on the flat surface of the table top are moved by gravity towards the virtual intersection of the two straight edges, thereby removing gaps between the bricks and indexing the bricks relative to both straight edges; after having been moved by gravity towards the virtual intersection of the two straight edges, i) a force is applied by the pusher on bricks within the brick layer so as to bias the bricks towards the first one of the two straight edges, ii) gaps are created along the first axis between some adjacent bricks by relatively moving the table portions therealong, and iii) the force is maintained on the bricks by the pusher until the brick layer is removed from the table top.

\* \* \* \* \*